(12) United States Patent
Hertema

(10) Patent No.: US 8,146,689 B2
(45) Date of Patent: Apr. 3, 2012

(54) ALL-TERRAIN VEHICLE AND SUSPENSION SYSTEM THEREFOR

(76) Inventor: Daryl Hertema, Midland, MI (US)

( * ) Notice: Subject to any disclaimer, the term of this patent is extended or adjusted under 35 U.S.C. 154(b) by 298 days.

(21) Appl. No.: 12/592,738

(22) Filed: Dec. 2, 2009

(65) Prior Publication Data

US 2010/0133018 A1   Jun. 3, 2010

Related U.S. Application Data

(60) Provisional application No. 61/200,675, filed on Dec. 2, 2008.

(51) Int. Cl.
*B62D 11/02* (2006.01)
*B62D 55/104* (2006.01)

(52) U.S. Cl. ...... 180/6.48; 180/9.38; 180/6.7; 180/9.26; 180/9.1; 180/9.21; 180/9.28; 180/9.3; 180/9.34; 180/907; 180/6.6

(58) Field of Classification Search ............... 180/6.48, 180/9.38, 6.7, 9.26, 9.1, 9.21, 9.28, 9.3, 9.34, 180/907, 6.6

See application file for complete search history.

(56) References Cited

U.S. PATENT DOCUMENTS

| | | | |
|---|---|---|---|
| 3,204,791 A | 9/1965 | Williams | |
| 3,259,200 A | 7/1966 | Maijala | |
| 4,077,483 A | 3/1978 | Randolph | |
| 5,577,567 A * | 11/1996 | Johnson et al. | 180/9.23 |
| 5,641,030 A * | 6/1997 | Toselli | 180/9.32 |
| 6,076,619 A | 6/2000 | Hammer | |
| 6,419,036 B1 | 7/2002 | Miglia | |
| 6,604,590 B2 | 8/2003 | Foulk, Jr. | |
| 6,688,414 B1 | 2/2004 | Bruno | |
| 7,845,443 B2 * | 12/2010 | Liberty et al. | 180/24.07 |

* cited by examiner

Primary Examiner — Joanne Silbermann
Assistant Examiner — Marlon Arce
(74) Attorney, Agent, or Firm — Robert L. McKellar; McKellar IP Law, PLLC

(57) ABSTRACT

An all-terrain vehicle having a unique suspension system for enabling handicapped individuals or invalids to easily access the vehicle and be self-transportable over ground or an ice surface.

14 Claims, 9 Drawing Sheets

ALL-TERRAIN VEHICLE AND SUSPENSION SYSTEM THEREFOR

This application claims priority from U.S. Provisional Patent Application No. 61/200,675 filed Dec. 2, 2008.

The invention disclosed and claimed herein deals with an all-terrain vehicle having a unique suspension system for enabling handicapped individuals or invalids to be self transportable over a ground or ice surface. It allows the occupancy of the vehicle at ground level from the front of the vehicle either by a wheelchair or direct occupancy of the navigator chair owing to the unique suspension system which is used to lift the components of the vehicle except the suspension system and the endless belt track systems All of this activity is controlled by hand levers directly in front of the occupant of the vehicle.

BACKGROUND OF THE INVENTION

There is a multiplicity of vehicles having different modes of support and transportation means to assist invalids or disabled persons in moving from one point to another. Typically, wheelchairs suffice for most of indoor use along with motorized vehicles that are designed to be used indoors.

However, there is still a major problem with movement of the disabled in the out-of-doors over gravel, cement, grass, ice, and general rubble in forests and roadways.

Devices have been designed to attempt to overcome this problem consisting essentially of a motor powered vehicle disclosed by C. E. Williams in U.S. Pat. No. 3,204,791, issued Sep. 7, 1965 which has a front ramp to allow the invalid to get into the vehicle while in a wheelchair.

U.S. Pat. No. 3,259,200 that issued on Jul. 5, 1966 to Maijala deals with a folding self-propelled invalid chair.

U.S. Pat. No. 4,077,483 that issued Mar. 7, 1978 to Randolph deals with an electrically powered vehicle for an invalid, said vehicle having a track drive with pivoted idlers accommodating travel over obstacles and through uneven terrain.

U.S. Pat. No. 6,076,619 that issued on Jun. 20, 2000 to Hammer deals with a self-powered all-terrain vehicle designed for self-assisted transfers of a paraplegic, or other disabled person, between the vehicle and a wheelchair. The vehicle is accessed over the track (fenders) and therefore the vehicle has a height limitation in that it has a passenger seating surface from at least 20 inches and not more than 27 inches above the ground surface.

U.S. Pat. No. 6,419,036 that issued Jul. 16, 2002 to Miglia deals with a vehicle for transporting an individual on a wheel chair over land, in which the vehicle utilizes a ramp or platform to allow access into the vehicle.

U.S. Pat. No. 6,688,414, that issued on Feb. 10, 2004 to Bruno deals with a vehicle for allowing users with limited physical capabilities to participate in off-road activities. The vehicle includes a housing having a bottom wall, a back wall, and a pair of side walls, a front drive system and a back drive system. The vehicle depends on a ramp to allow accessibility of a handicapped person into the vehicle.

Finally, U.S. Pat. No. 6,604,590 that issued Aug. 12, 2003 to Foulk, Jr. deals with a battery powered all-terrain vehicle for the physically challenged that comprises a battery powered transportation unit that allows a handicapped person to travel on otherwise inaccessible terrain.

None of the above-described vehicles have the capabilities of the device of the instant invention vehicle. For example, the vehicle of this invention allows for the insertion of a wheelchair directly into the front of the vehicle at ground level without a ramp device, or the occupancy of the navigator chair directly from the front at ground level, while the nearest thing to these modes that is in the prior art is low profile vehicles that allow occupancy by going over the fenders.

THE INVENTION

This invention deals with a new and novel vehicle all-terrain vehicle that will allow front accessibility at the ground level through the use of a novel moveable suspension system that lifts and lowers the entire components of the all-terrain vehicle except the endless drive tracks and drive means such as the supporting wheels for the track and the drive sprocket.

Thus, this invention deals in one embodiment with an all-terrain vehicle for enabling invalids or handicapped individuals to be self transportable over a ground or ice surface. The all-terrain vehicle comprises: a longitudinally elongated under frame carried between two endless track mechanisms, wherein each of the track mechanisms has an endless belt about the same, including pivotally mounted idler wheels and a rear drive sprocket in driving engagement with the belt, each said endless track mechanism covered by an enclosed fender. The endless belt track is adjustable by an adjustment mechanism.

There is a framed open space located between the two endless track mechanisms and a hydraulic drive means mounted on the frame of the framed open space, the hydraulic drive means including hydraulic motors coupled to the drive sprockets, each motor supported by a motor mount assembly attached to the under frame.

There is an internal combustion engine mounted on the frame of the framed open space and coupled to the hydraulic drive means for powering the vehicle, and a hydraulic drive control means mounted on the vehicle for initiating and controlling forward, reverse, and turning movements of the vehicle over ground and ice surfaces using hand levers. There is an auxiliary hydraulic pump in the system to allow for raising and lowering the components as set forth infra. The auxiliary is also used to operate any attachments that reside on the vehicle.

There is a novel suspension system associated with a means for lifting all of the vehicle components except the endless track means, drive sprockets and support wheels, simultaneously from ground level to any desired operating level, and lowering them simultaneously to any desired level from the operating level to the ground level, controlling such movement by hand levers, to enable the invalid or handicapped individual to enter the vehicle at ground level without the use of a ramp or other means and this is a second embodiment of this invention.

The vehicle of this invention has been described by a college professor of engineering as a vehicle, wherein "Stability is a huge issue. But the double tread and wide under base and the front loading with the removable seat is unique."

DETAILED DESCRIPTION OF THE INVENTION

Figure 1:
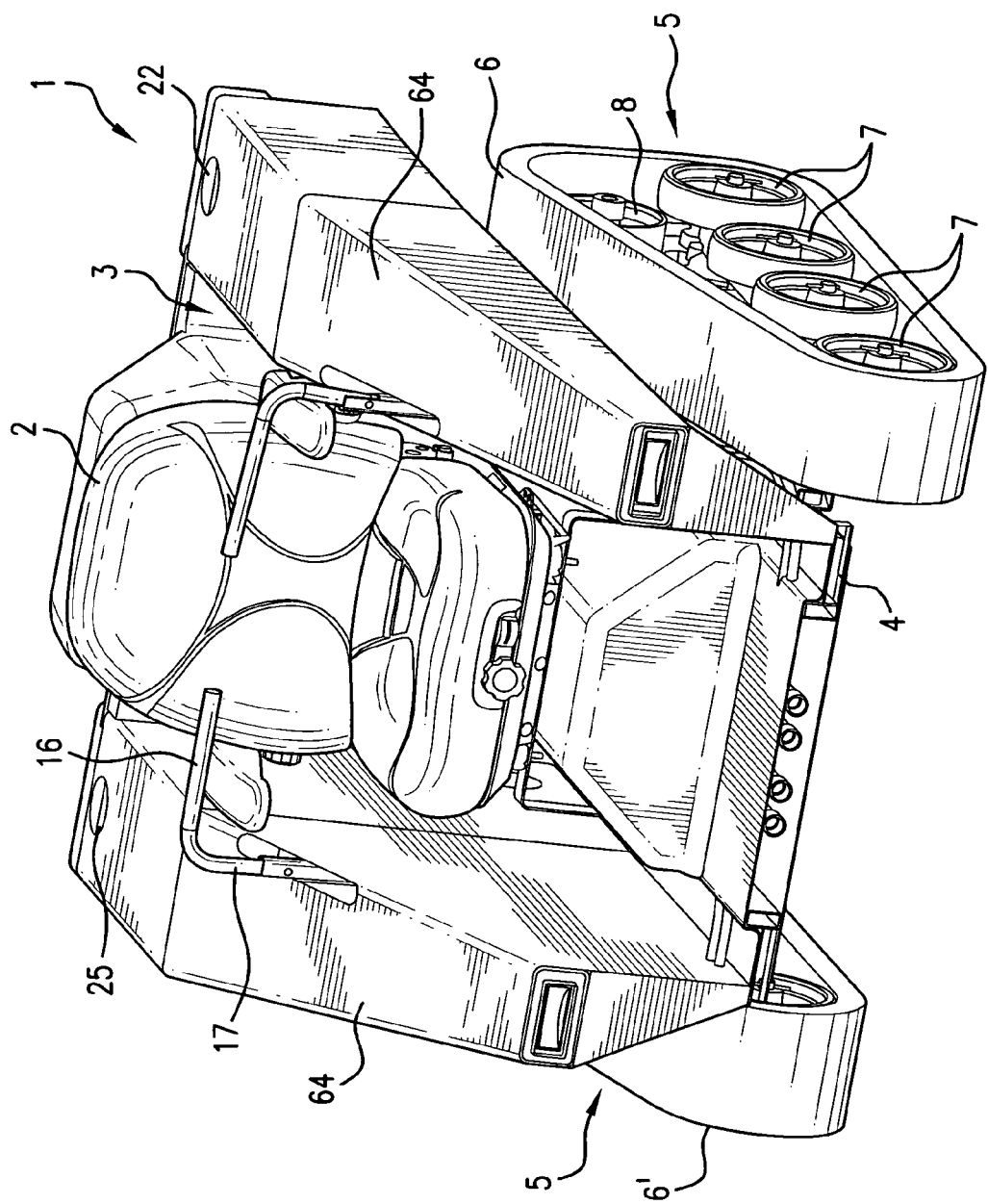
FIG. 1 is front view in perspective of a device of this invention showing a navigator seat installed in the open space.

Turning now to FIG. 1 that is a front view in perspective of a device 1 of this invention showing a navigator seat 2 installed in an open space 3 in the middle of the vehicle.

Figure 2:
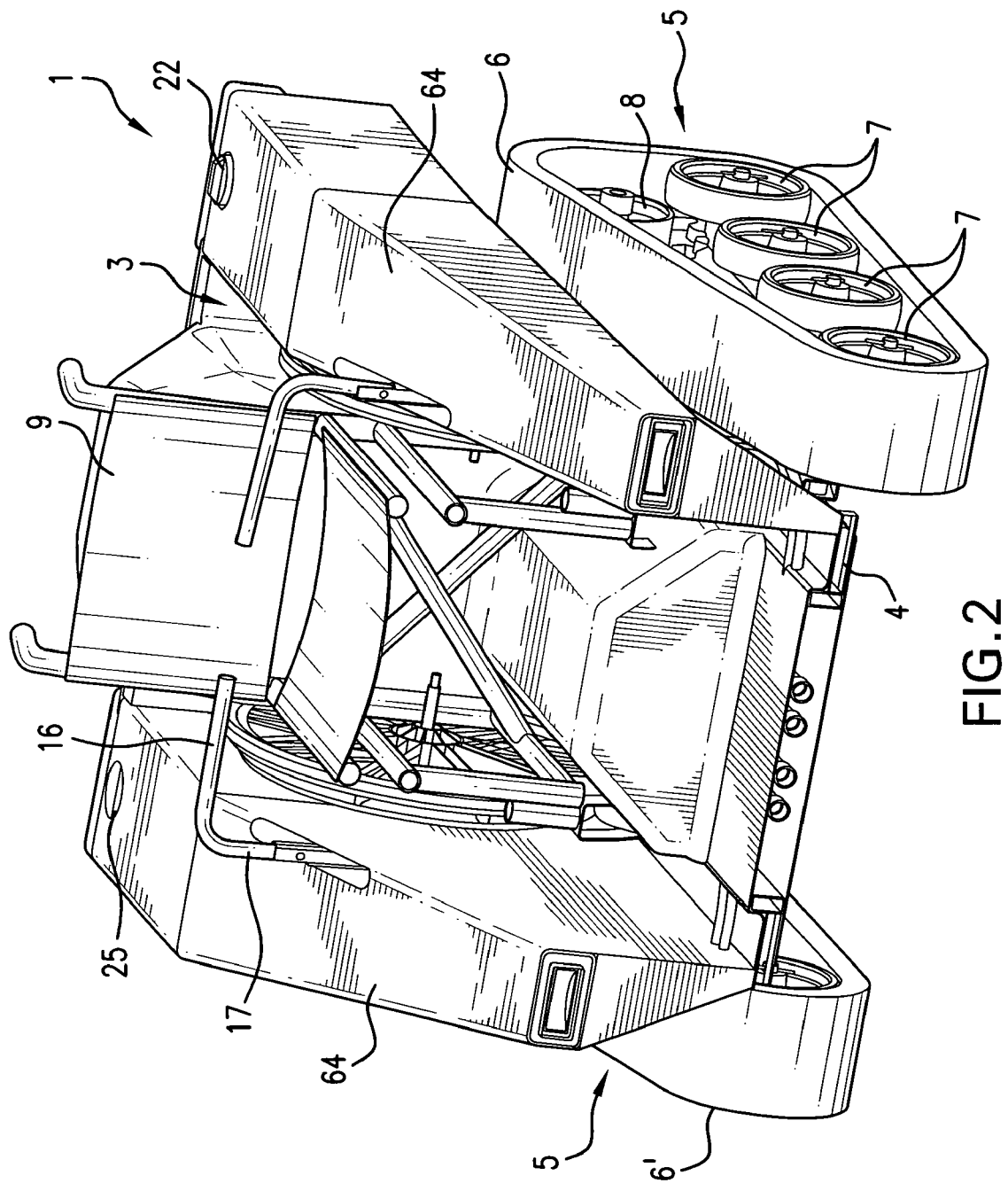
FIG. 2 is a front view in perspective of a device of this invention showing the placement of a wheelchair in the open space.

FIG. 2 is a front perspective view of the device 1 of FIG. 1, in which there is shown a wheel chair 9. Provisions for the wheelchair 9 will be described infra.

In addition, there is shown a portion of an under frame 4 that is carried between two endless track mechanisms 5, each said track mechanism 5 having an endless belt 6 and 6'. There is in addition, a series of pivotally mounted idler wheels 7 and rear drive sprockets 8 that are in driving engagement with the belts 6 and 6' (the drive shown in FIG. 3). As indicated Supra, there is a framed open space 3 created and located between the two endless track mechanisms 5.

Figure 3:
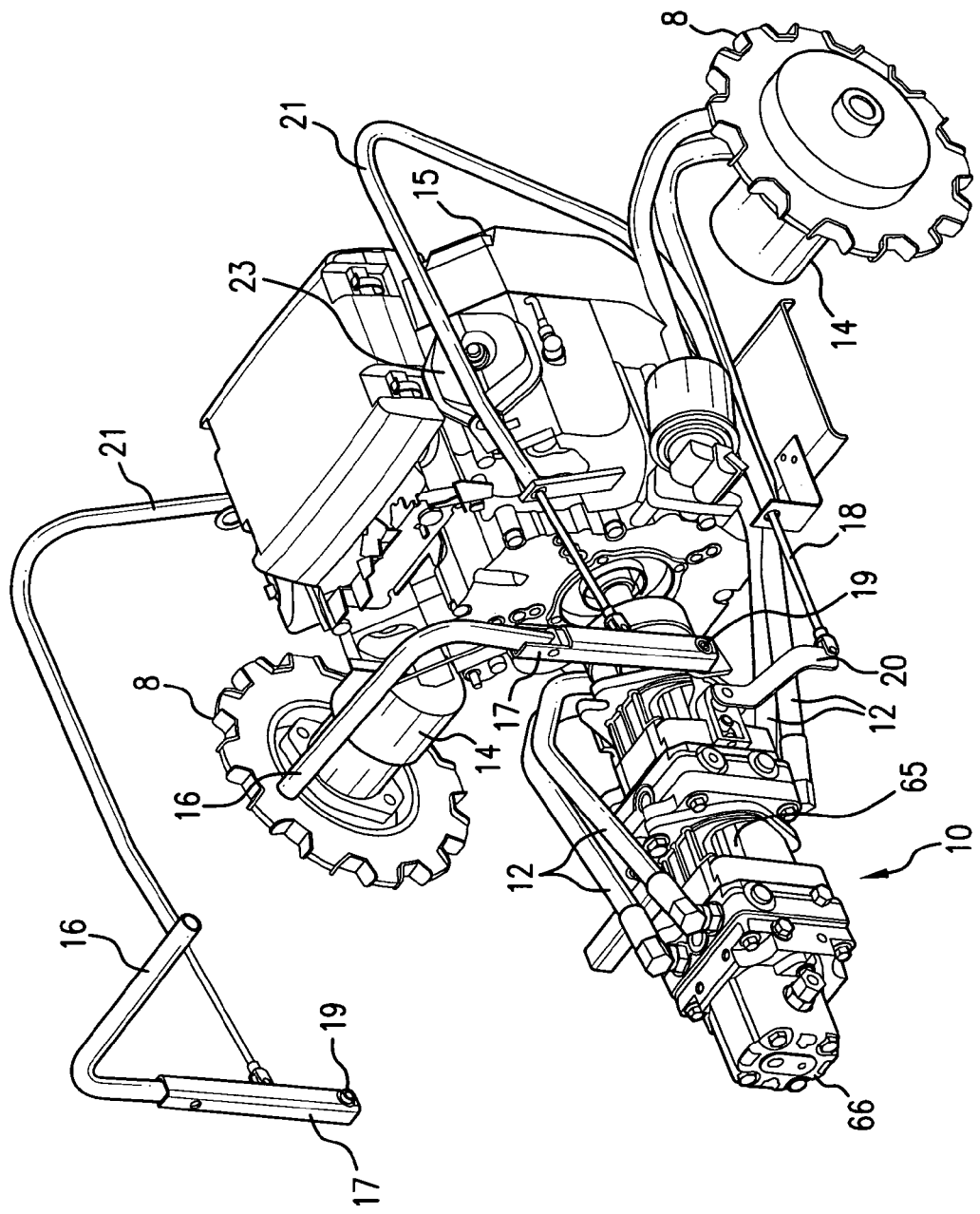
FIG. 3 is a view in perspective of the engine, drive mechanism, a portion of the hydraulics, and controls for a device of this invention.
Figure 4:
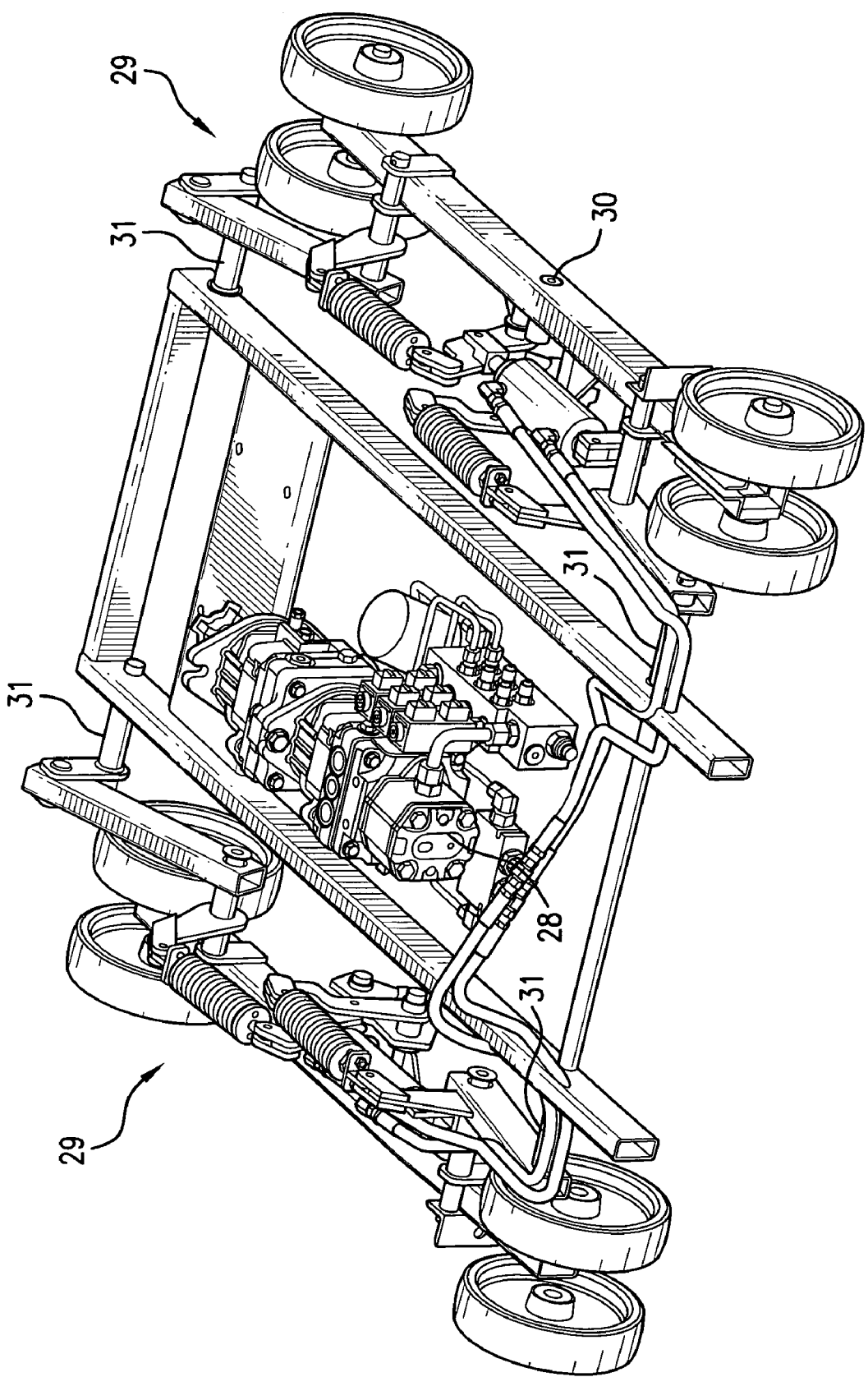
FIG. 4 is a view in perspective of the support frame, hydraulic components, and unique suspension system for the devices of this invention.

With reference to FIGS. 3 and 4, there is shown a hydraulic drive means 10 mounted on the vehicle 1. The hydraulic drive means 10 consists of pumps, a right hand drive pump 65, a left hand drive pump 59, and an auxiliary pump 66 and hydraulic delivery hoses 12, as well as hydraulic drive motors 14 attached to the drive sprockets 8 on each sprocket respectively. The hydraulic drive means 10 is coupled to hydraulic motors 14 by hydraulic hoses 12, the hydraulic motors 14 being attached to the drive sprockets 8.

The energy and the drive means for the vehicle 1 is a motor 15 (see FIG. 3) which in this invention is a small internal combustion engine 23. The motor 15 also powers the hydraulic system on the vehicle 1.

Control of the movement of the vehicle 1 is provided by the handle bars 16, which are attached to vertical posts 17, which are pivotally connected 19 to the vehicle 1 which are in turn coupled to cable 18 by a cable control bar 20.

A very unique feature of the inventive vehicle 1 is the hydraulic system. There are three hydraulic pumps, two for propelling the vehicle 1, a left hand drive pump 59, a right hand drive pump 65, and a third pump 66, which is the auxiliary pump for driving the options such as the vehicle lift system, operating the snow blade, the ice auger, the snow blower, etc. No other handicap vehicle is equipped in this manner. The control of all of these options is done by the hand levers 16.

The navigator seat 2 is adjustable hydraulically in a vertical movement.

Covering the endless track mechanisms 5 are fenders 63. Shown at the back end of the fenders 63, on the right side, is an opening 22 for the fuel tank 24 for the small combustion engine 23, which is not shown as the fender 21 covers the fuel tank 24. The fuel tank 24 is mounted on a small shelf that is not shown. On the left side of the vehicle 1, is an opening 25, that is in the top of the fender 21. Underneath this opening 25 is a battery compartment for a battery for the small combustion engine 23. The battery is not shown as it is covered by the fender 21.

For convenience, electric lights 26 are installed in the front of the fenders 63, however, such lights do not need to be so installed and they can be installed at any place of convenience. Contemplated within the scope of this invention is a roll bar that is mounted over the top of the vehicle 1, which could also provide a space for lights. Such a roll bar is conventional with vehicles of this type and is not shown for clarity of the overall invention.

Turning now to FIG. 4, which is a view in perspective of the support frame 4, hydraulic components, and unique suspension system 29 for the devices of this invention, there is shown the entire support frame 4, hydraulic hoses 12, the motor 15, and a portion of the hydraulic system 28.

This Figure shows the novel and unique suspension system 29 for the vehicle 1. As shown, the vehicle 1 requires a left version and a right version of the suspension system one (the left side) of which is shown in detail in FIG. 6, the suspension systems 29 being essentially mirror images of each other. Note that the suspension system and the endless belt track with accompanying wheels are the only portions of the vehicle 1 that are not lifted or lowered as will be described in detail infra. FIG. 4 shows the opening 30 for the idler wheels 7 as this opening 30 cannot be observed in any other Figure in this application.

It should also be noted from FIG. 4 that the frame 4 is connected to the suspension system 29 by lift rods 31, the lift rods 31 being a part of the suspension system 29.

Figure 5:
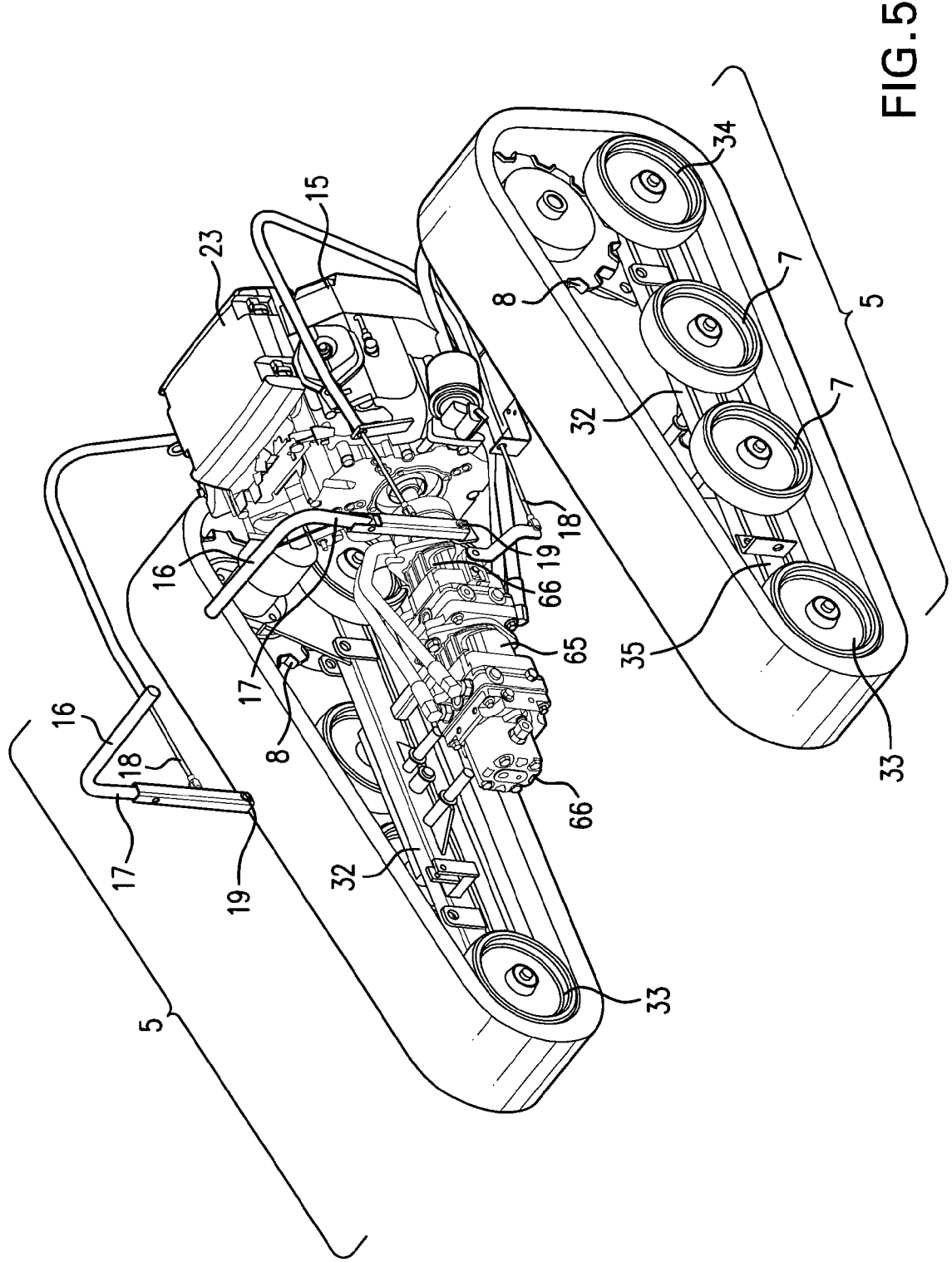
FIG. 5 is a view in perspective of the components of FIG. 3 and also including the endless drive tracks.

FIG. 5 is a view in perspective of the components of FIG. 3 and also including the endless track mechanisms 5. The endless track mechanism 5 components include an elongated support bar 32 on which are mounted a central set of two, side by side idler wheels 7. Mounted on either side of the idler wheels 7 is a single set of wheels 33 at the front and a single set of wheels 34 at the back. The single set of wheels 33 at the front are mounted on an adjustment mechanism 35 for adjusting the tension in the endless belts 6. Each of the wheels 7, 33 and 34 are free wheeling or are otherwise driven by the endless belts 6.

Figure 7:
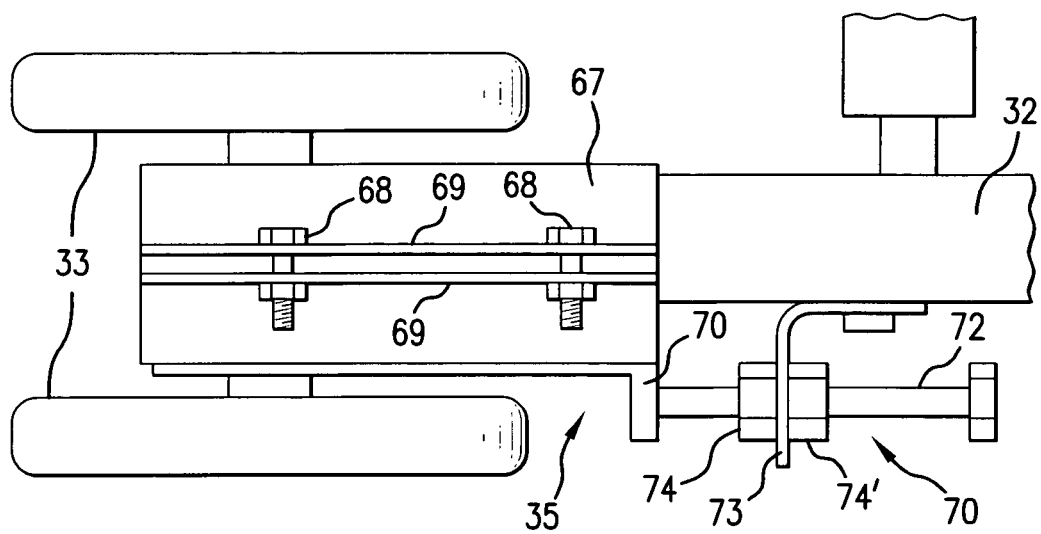
FIG. 7 is a top view of the front portion of FIG. 6 showing the adjustment device for the endless belt track of this invention.
Figure 12:
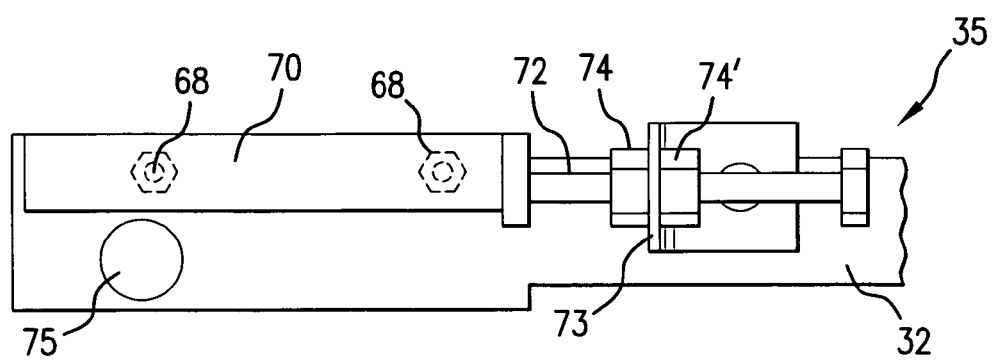
FIG. 12 is a full side view of the adjustment device of FIG. 7.

The adjustment mechanism 35 is shown in FIG. 7 and also in FIG. 12 and is comprised of a carriage 67, compression bolts 68, compression walls 69, drive tab 70, and the drive mechanism 71.

The drive mechanism 71 is comprised of a drive bolt 72 and a drive plate 73. Internally threaded nuts 74 and 74' are welded or otherwise affixed to the drive plate 73. The drive plate 73 is fixedly attached to the support bar 32.

In use, the bolts 68 are loosened and the compression walls 69 detract from each other and allow the adjustment mechanism 35 to be slidably moved forward or backward along the support bar 32 as is desired. There is one of these adjustment mechanisms 35 on each of the left and right support bars 32 at the front of the vehicle 1. With the adjustment mechanism 35 loosened, the drive bolts 72 can be turned in or out to adjust the tension in the endless drive belts 5 and 5'.

The round bar 75 is the bar on which the front wheel 33 is mounted and the wheels 33 have been left off the FIG. 12 for clarity.

Also shown in FIG. 5 is the approximate location of the endless track mechanisms 5 on either side of the hydraulic pump 11 and hoses 12 and motor 15.

Figure 6:
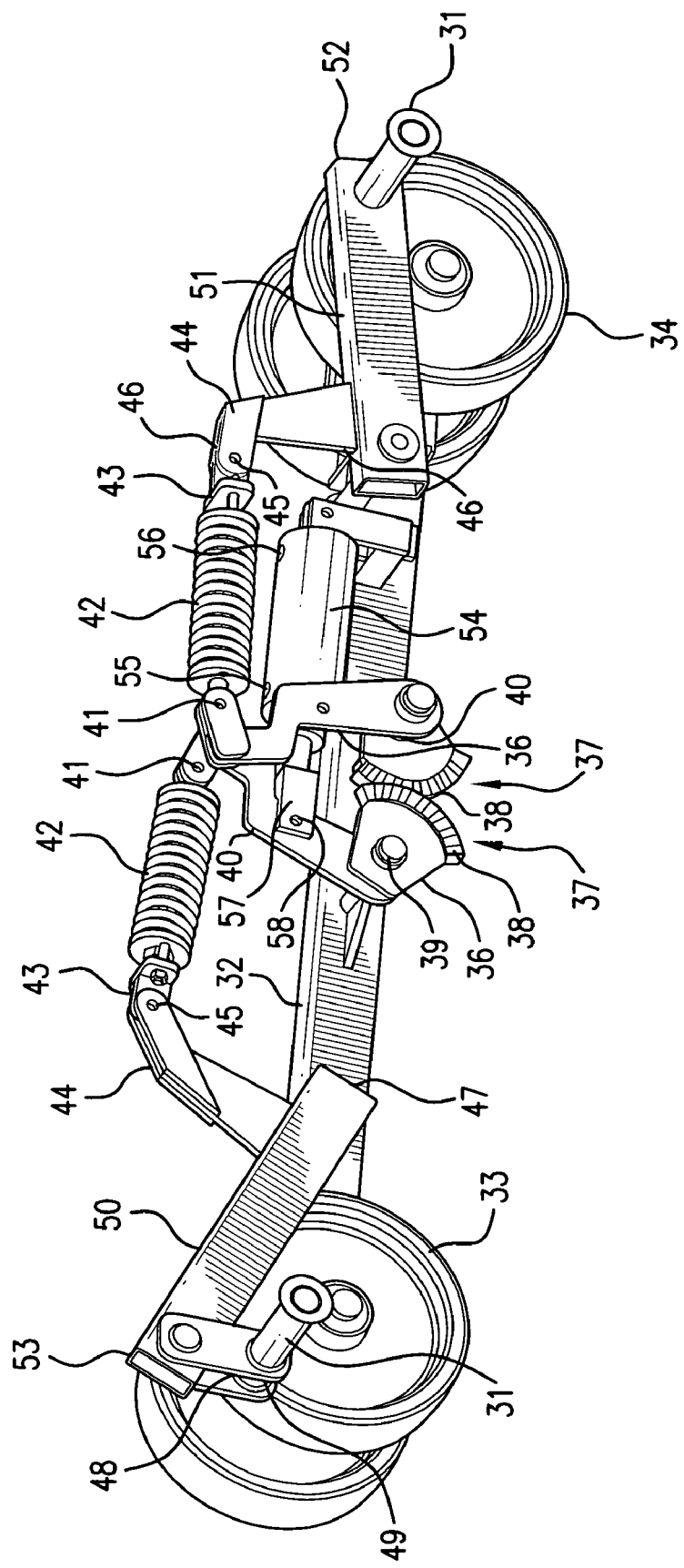
FIG. 6 is a view in perspective of a unique suspension system of this invention.

Turning now to FIG. 6, there is shown a view in perspective of a unique suspension system 29 of this invention without the set of idler wheels 7 in order to induce clarity to the drawing.

Each of the suspension systems 29 are comprised of the support bar 32 on which is mounted a set of forward wheels 33 and a set of rear wheels 34. Also mounted on the inside of the center of the support bar 32 is a set of center pivots 36 having toothed forward edges 37. The teeth 38 of the toothed forward edges 37 interleave. The center pivots 36 are supported by pins 39 and are mounted with sleeved bearings (not shown) on the pins 39.

Each of the center pivots 36 have attached to them arms 40 that are affixed to the respective center pivots 36 and move simultaneously with the center pivots 36. Attached to the top end 41 of the arms 40 are suspension springs 42. The opposite ends 43 of the suspension springs 42 are attached to spring attachment arms 44 at point 45.

At this point, the connection to the lift pivot arms, (at the back 50 and at the front 51) is different. At the front, pivot lift arm 51 is pivotally connected to the opposite end of arm 44 at point 46 and the lift rods 31 are fixedly attached to end 52 of the front pivot lift arm 51.

In the back (rear), arm 44 is pivotally attached through the support bar 32, to the rear lift pivot arm 50 at point 47. Pivotally attached to the opposite end 53 of rear lift pivot arm 50 is a rocker take up 48. This arrangement is essentially a pivot within a pivot. Attached to the opposite end 49 of the rocker take up 48 is the lift rod 31.

Shown within the structure is the lift cylinder 54 that is hydraulically actuated. The hydraulic hoses are not shown, but the openings 55 and 56 are shown for coupling such hydraulic hoses.

When actuated by the driver of the vehicle 1, the hydraulic system drives the arm 40 backward by attachment 57, which is pivotally attached to the arm 40 at point 58. Driving the arm 40 backward results in the teeth 38 meshing with the teeth on the other center pivot 36, driving the arm 40 forward.

Simultaneously, the rear spring 42 moves backward driving the arm 44 backward, which tends to lower the rear lift pivot arm 50 and thus, lowers the rocker take up 48 and the rear lift rod 31. Meanwhile, the forward spring 42 drives arm 44 forward which in turn raises the end 46 and lowers the end 52 thereby lowering the lift rod 31. Anything attached to the lift rods 31 are thereby lowered, namely, the frame 4 with all of the aforementioned components located on or attached thereto.

Obviously, when the movement of the arms 40 in the opposite direction lifts the lift rods 31 and the frame 4, and all of the aforementioned components located on or attached thereto.

Figure 8:
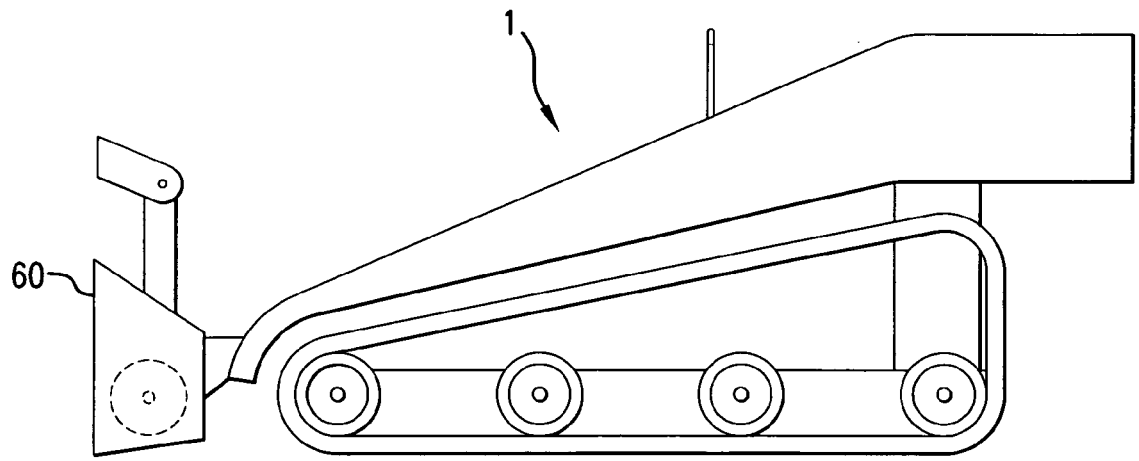
FIG. 8 illustrates a vehicle of this invention with a front mounted snow blower.
Figure 9:
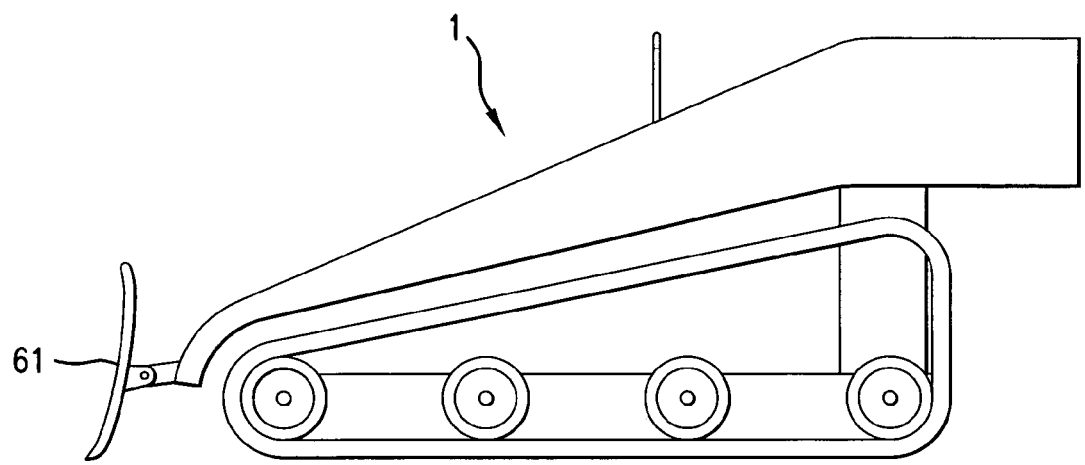
FIG. 9 illustrates a vehicle of this invention with a front mounted snow plow.
Figure 10:
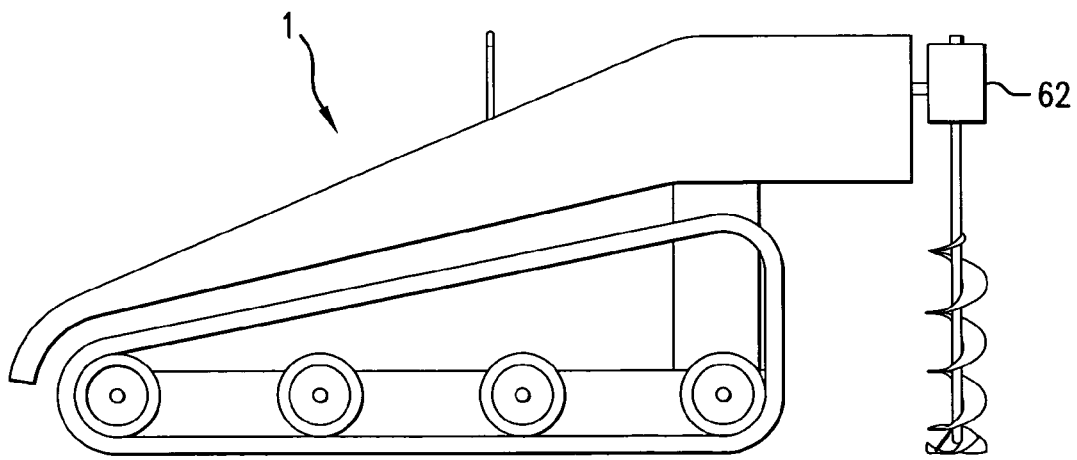
FIG. 10 illustrates a vehicle of this invention with a back mounted ice auger.
Figure 11:
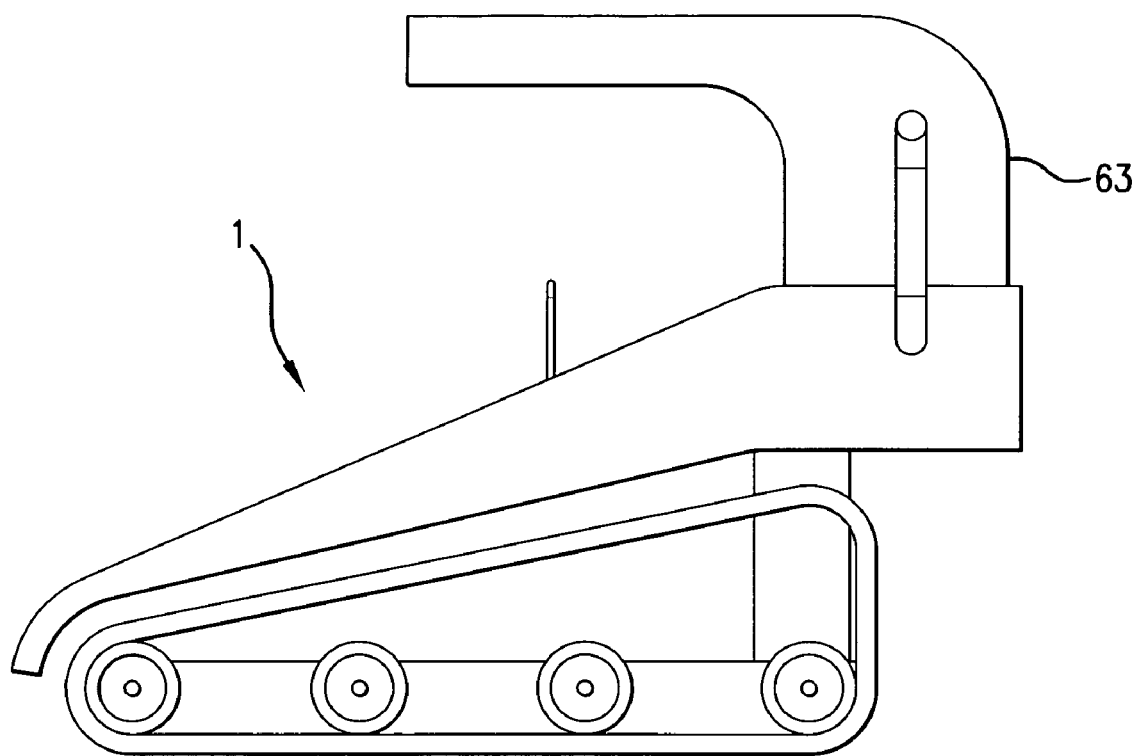
FIG. 11 illustrates a vehicle of this invention with a top cab over the vehicle.

The vehicle of this invention is capable of being equipped with a variety of useful pieces of equipment. For example, FIG. 8 illustrates a vehicle of this invention with a front mounted snow blower 60. FIG. 9 illustrates a vehicle of this invention with a front mounted snow plow 61. FIG. 10 illustrates a vehicle of this invention with a back mounted ice auger 62 and FIG. 11 illustrates a vehicle of this invention with a top cab 63 over the vehicle.

What is claimed is:

1. An all-terrain vehicle for enabling invalids or handicapped individuals to be self transportable over ground or an ice surface, comprising:
   a. a longitudinally elongated under frame carried between two endless track mechanisms, each of said track mechanisms having an endless belt about the same and pivotally mounted idler wheels and a rear drive sprocket in driving engagement with the belt, each said endless track mechanism covered by an enclosed fender, each said endless track mechanism being capable of being adjusted by an adjustment mechanism;
   b. a framed open space located between the two endless track mechanisms;
   c. a hydraulic drive means mounted on the vehicle, said hydraulic drive means including hydraulic motors coupled to said drive sprockets, each motor supported by a motor mount assembly attached to the under frame;
   d. an internal combustion engine mounted on the vehicle and coupled to the hydraulic drive means for powering the vehicle; and
   e. a hydraulic drive control means mounted on the vehicle for initiating and controlling forward, reverse, and turning movements of the vehicle over said ground and ice surfaces using hand levers;
   f. an auxiliary hydraulic pump;
   g. a suspension system associated with f. for lifting the frame of a. and the components b. through f. and any attachments that reside on the vehicle, simultaneously from ground level to any desired operating level and lowering the same simultaneously to any desired level from the operating level to the ground level, all such movement being controlled by the hand levers.

2. The all-terrain vehicle of claim 1 further comprising a hydraulic fluid tank mounted on the vehicle.

3. The all-terrain vehicle of claim 1 further comprising a fuel tank for the internal combustion engine mounted on the vehicle.

4. The all-terrain vehicle as claimed in claim 1 wherein, in addition, there is mounted on the vehicle a snow blade.

5. The all-terrain vehicle as claimed in claim 1 wherein, in addition, there is mounted on the vehicle a snow blower.

6. The all-terrain vehicle as claimed in claim 1 wherein, in addition, there is mounted on the vehicle an ice auger.

7. The all-terrain vehicle as claimed in claim 1 wherein, in addition, there is mounted on the vehicle, a closable cab.

8. The all-terrain vehicle as claimed in claim 1 wherein, in addition, there is a chair for an occupant provided in the open space.

9. The all-terrain vehicle as claimed in claim 8 wherein the chair is adjustable.

10. The all-terrain vehicle as claimed in claim 9 wherein the chair is adjustable in a vertical line.

11. The all-terrain vehicle as claimed in claim 10 wherein, in addition, the chair is adjustable in a forward and backward motion.

12. The all-terrain vehicle as claimed in claim 1 wherein there is, in addition, a wheel chair located in the open space.

13. A drivable suspension system for an all-terrain vehicle for lifting and lowering:
   a. a longitudinally elongated under frame carried between two endless track mechanisms;

b. a framed open space located between the two endless track mechanisms;
c. a hydraulic drive means, said hydraulic drive means including hydraulic motors coupled to drive sprockets, each motor supported by a motor mount assembly attached to the under frame;
d. an internal combustion engine coupled to the hydraulic drive means; and
e. an auxiliary hydraulic pump;
f. a hydraulic drive control means for initiating and controlling forward, reverse, and turning movements of the vehicle over ground and ice surfaces, said suspension system being capable of lifting the frame of a. and the components b. through f. simultaneously from ground level to any desired operating level and lowering the same simultaneously to any desired level from the operating level to the ground level, all such movement being controlled by hand levers.

14. The suspension system as claimed in claim 13 which is hydraulically driven.

* * * * *